(12) United States Patent
Blond et al.

(10) Patent No.: US 9,452,779 B2
(45) Date of Patent: Sep. 27, 2016

(54) CONTROL METHOD OF A POWER STEERING SYSTEM FOR A VEHICLE HAVING TWO STEERED AXLES

(71) Applicant: VOLVO TRUCK CORPORATION, Göteborg (SE)

(72) Inventors: Jean-Marc Blond, Saint Pierre de Chandieu (FR); Jean-Baptiste Doray, Chasse sur Rhone (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/647,518

(22) PCT Filed: Dec. 27, 2012

(86) PCT No.: PCT/IB2012/003058
§ 371 (c)(1),
(2) Date: May 27, 2015

(87) PCT Pub. No.: WO2014/102562
PCT Pub. Date: Jul. 3, 2014

(65) Prior Publication Data
US 2015/0307128 A1 Oct. 29, 2015

(51) Int. Cl.
*B62D 7/15* (2006.01)
*B62D 7/14* (2006.01)
*B62D 5/20* (2006.01)

(52) U.S. Cl.
CPC .............. *B62D 7/159* (2013.01); *B62D 5/20* (2013.01); *B62D 7/144* (2013.01)

(58) Field of Classification Search
CPC .......... B62D 5/20; B62D 5/30; B62D 7/144; B62D 7/1581; B62D 7/159
See application file for complete search history.

(56) References Cited

U.S. PATENT DOCUMENTS 4,836,319 A * 6/1989 Haseda ................. B62D 7/159
180/412
4,862,987 A * 9/1989 Legueu ................. B62D 7/144
180/22

(Continued)

FOREIGN PATENT DOCUMENTS

EP 0350019 A2 1/1990
EP 1826098 A2 8/2007

OTHER PUBLICATIONS

International Search Report (Sep. 9, 2013) for corresponding International App. PCT/IB2012/003058.

*Primary Examiner* — Jerrah Edwards
*Assistant Examiner* — Tamara Weber
(74) *Attorney, Agent, or Firm* — WRB-IP LLP (57) ABSTRACT

A power steering system includes a first steering device which controls the steering of the first wheels of the vehicle according to a first steering angle α1 and includes a first actuator capable of providing a steering assistance effort, a second steering device including a second actuator controlled by a controller as a function of a parameter related to the steering wheel movement, and controlling the steering of the second wheels, according to a second steering angle α2. In normal operation of the power steering system, α2 is set according to a first rule depending on the first steering angle α1. In case the steering wheel torque is greater than a predetermined threshold, the second steering device is operated in a forced mode by setting the second steering angle according to a rule depending on the first steering angle and taking into account at least one different or additional data, in order to cause an offset-oversteering of the second wheel.

24 Claims, 6 Drawing Sheets

(56) References Cited

U.S. PATENT DOCUMENTS

| | | | |
|---|---|---|---|
| 5,762,160 A * | 6/1998 | Shimizu | B62D 5/0463 180/169 |
| 6,622,813 B2 * | 9/2003 | Matz | B62D 5/001 180/402 |
| 6,882,917 B2 * | 4/2005 | Pillar | A62C 27/00 180/65.27 |
| 2012/0226417 A1 * | 9/2012 | Nishikawa | B60T 8/1755 701/42 |
| 2013/0060414 A1 * | 3/2013 | Lee | B62D 1/286 701/23 |

* cited by examiner

CONTROL METHOD OF A POWER STEERING SYSTEM FOR A VEHICLE HAVING TWO STEERED AXLES

BACKGROUND AND SUMMARY

The present invention relates to a control method of a power steering system for a vehicle having two steered axles. The invention further relates to a power steering system and to a vehicle having two steered axles and equipped with such a power steering system, especially an industrial vehicle such as a heavy truck.

A power steering system has been a standard feature in vehicles for many years, in particular in industrial vehicles. Such a system assists the vehicle driver by applying a force to the wheels, through a steering actuator, which complements the effort, of the driver which is mechanically transmitted from the steeling wheel to the steered wheels of the vehicle. Therefore, a lower effort is required for the driver when turning the steering wheel and the vehicle is easier to manoeuvre.

Also know is a power steering system for a vehicle having two steered axles. For example, the vehicle has two front axles, and the two steered axles are the two front axles. The vehicle then comprises a first steered axle joining two first wheels and a second steered axle joining two second wheels, said second steered axle being located rearward from the first steered axle. Nevertheless, in some cases, one steered axle may be a front axle and the second steered axle may be a rear axle. In these last cases and when the vehicle is turning, the wheels of the rear steered axle are turned in the opposite direction compared to the wheels of the front steered axle.

Typically this power steering system to which the movement of a steering wheel is transmitted via a steering column. The steering gear can comprise a hydraulic actuator. In this case, the movement is assisted by hydraulic pressure from a pump, and then transmitted by a mechanical arrangement to one of the first wheels. A transverse track rod transmits the movement of said first wheel to the other first wheel.

In a first type of conventional system, steering to the second axle can be achieved via one or more link rods fixed on the vehicle frame that mechanically links the steering system of the second axle to the steering system of the first axle, and a second actuator which is hydraulically connected to the hydraulic actuator of the steering gear. The purpose of the link rods is to set the steering angle of the second axle according to the steering angle of the first axle, while the second actuator is used to transmit servo power on the second axle.

However, two significant drawbacks of this first type of conventional power steering system are that it comprises heavy and expensive parts, and that it requires space—while the corresponding allotted space is generally limited. Therefore, the implementation of such a system leads to heavy packaging work and involves some limitations due to the size of the wheels and/or of the frame.

In order to provide a power steering system which requires less space and which has a reduced weight, a second type of conventional system has been proposed. In such a system, steering to the second axle can be achieved via one or several actuators that are not mechanically linked to the first axle, but that are controlled as a function of the steering angle of the first wheels. In practice, there can be provided a second actuator controlled by a controller as a function of a parameter related to the steering wheel movement, and designed to control the steering of at least one of the second wheels, according to a second steering angle which is set according to a rule depending on the first steering angle of the first wheels.

One problem with this second type of conventional system is that, in some conditions, steering the vehicle may be very difficult insofar as too high an effort is required for the driver, because the power steering system does not properly work. For example, this can be due to the fact that either the device providing a steering assistance to the first wheels does not operate normally or sufficiently, or the fact that the operation of the device providing a steering assistance to the second wheels has not been triggered.

As a consequence, this second type of conventional system may not fully comply with the regulations.

It therefore appears that, from several standpoints, there is room for improvement in power steering systems for vehicles.

It is desirable to provide an improved power steering system, for a vehicle having two steered axles, which can overcome the drawbacks of the prior art.

It is also desirable to provide a power steering system which requires less space than the prior art systems and which has a reduced weight, while also being effective and reliable, in that it ensures the provision of a sufficient steering assistance effort in substantially any situation.

According to a first aspect, the invention relates to a control method of a power steering system for a vehicle having two steered axles, i.e. a first steered axle joining two first wheels, and a second steered axle joining two second wheels, the power steering system comprising:
  a first steering device designed to control the steering of at least one of the first wheels, according to a first steering angle $\alpha 1$, said first steering device comprising:
    a mechanical transmission of the movement from a steering wheel of the vehicle to at least one of the first wheels;
    a steering assistance device including a first actuator controlled as a function of a parameter related to the steering wheel movement and capable of providing a steering assistance effort to at least one of the first wheels;
  a second steering device comprising a second actuator controlled by a controller as a function of a parameter related to the steering wheel movement, and designed to control the steering of at least one of the second wheels, according to a second steering angle $\alpha 2$ which is set according to a first rule $F1(\alpha 1)$ depending on the first steering angle $\alpha 1$, in normal operation of the power steering system;
  wherein the control method comprises:
  detecting or estimating whether a steering wheel torque is greater than a predetermined threshold;
  in case the steering wheel torque is greater than said threshold, operating the second steering device in a forced mode by setting the second steering angle $\alpha 2$ according to a rule which depends on the first steering angle $\alpha 1$ and which takes into account at least one different or additional data, in order to cause an offset-steering of said second wheel.

In practice, during normal operation, no excessive demands are made on the driver's strength to manoeuvre the vehicle, either solely by the mechanical transmission or through the additional operation of the first and second actuators.

In said normal operation also called "normal mode", the first steering device is controlled as a function of a parameter related to the steering wheel movement, which can be the steering wheel angle, the steering wheel speed, or the steering effort—or torque—on the steering wheel. The first wheels are thus made to steer according to a first steering angle $\alpha 1$ depending on said parameter.

Moreover, the second wheels are made to steer not through a mechanical link with the first wheels, but by means of the second steering device. More precisely, the second actuator is controlled as a function of a parameter related to the steering wheel movement—for example related to the steering wheel angle—by a controller which, in response to the steering wheel movement, and given the current first steering angle $\alpha 1$, sets the second steering angle $\alpha 2$ according to the following equation: $\alpha 2 = F1(\alpha 1)$. For geometrical and mechanical reasons, $\alpha 2$ should not be identical to $\alpha 1$.

It has to be noted that the first rule $F1(\alpha 1)$ can be defined by a function that is linear or not and can further depend on other parameters than $\alpha 1$ such as the vehicle speed, etc.

Simultaneously, detecting means are provided to detect or estimate if the steering wheel torque is greater than a predetermined threshold. Typically, the detecting means can be included in monitoring means for monitoring the steering wheel torque.

In case the steering wheel torque is greater than said threshold, the second steering device is operated in the forced mode, where $\alpha 2$ is determined according to a rule that takes into account at least one different or additional data in such a manner that:

for a given value of $\alpha 1$ and when the torque is applied by the driver on the steering wheel in order to turn the second wheels so that they move away from their neutral position, the absolute value of $\alpha 2$ is greater in the forced mode than the absolute value of $\alpha 2$ determined in the normal mode, the second wheels are in this first case oversteered with respect to what would happen in normal mode, i.e. with respect to the value set by the controller in normal mode given the parameter related to the steering wheel movement;

for a given value of $\alpha 1$ and when the steering wheel torque is applied in order to turn the second wheels so that they move closer to their neutral position, the absolute value of $\alpha 2$ is lower in the forced mode than the absolute value of $\alpha 2$ determined in the normal mode, the second wheels are in this second case understeered with respect to what would happen in normal mode.

The term "neutral position" means a position where the wheels of a steered axle are in line with the other wheels and are oriented parallel to the vehicle longitudinal axis that extends from the front to the rear of the vehicle.

The term "oversteer" means that the absolute value of the corresponding angle $\alpha 2$ is greater than it would be in normal mode, bearing in mind that the sign of $\alpha 2$ depends on the direction in which the steering wheel is turned.

The term "understeer" means that the absolute value of the corresponding angle $\alpha 2$ is lower than it would be in normal mode.

The term "offset-steer" refers to an oversteer or an understeer of the wheels of the second steered axle depending if the torque is applied by the driver on the steering wheel in order to turn the second wheels so that the move away from their neutral position (oversteer) or is applied in order to turn the second wheels so that they move closer to their neutral position (understeer).

The oversteering or understeering of the second wheels causes the vehicle to turn according to a given direction and the first wheels to tend to follow this direction. Therefore the resistive effort that opposes to the rotating movement of first wheels and that results from the frictional effort between the first wheels and the road is reduced. Consequently, the driver can then more easily manoeuvre the first steering axle, even only through the mechanical transmission. As a results, owing to the operation of the system in a forced mode, the vehicle is made to turn without excessive effort from the driver.

Owing to the fact that an offset-steering is triggered by a steering wheel torque greater than a predetermined threshold, the invention ensures that the power steering system always provides an assistance to reduce effort required by the driver when turning the steering wheel or when he wants to turn the steering wheel. The steering wheel torque threshold has to be adequately set to trigger the forced mode before too great an effort is required from the driver.

The control method may comprise operating the second steering device in a forced mode in case a failure is detected in the operation of the steering assistance device. This can be a failure of the first hydraulic actuator or of another part of the steering assistance device of the first steering device. In this case, the driver may not succeed to manoeuvre the vehicle only with the mechanical transmission and the second steering device operated in normal mode. Owing to the operation in forced mode involving an offset-steering of the second steered axle, an assistance is provided to reduce effort required by the driver when turning the steering wheel or when he wants to turn the steering wheel.

Alternatively, the second steering device may be operated even if the steering assistance device of the first steering device is fully operational, but in case an additional steering assistance is required to prevent the driver from having to exert too great an effort on the steering wheel. This can for example happen if the vehicle is overloaded or in case of very uneven grounds, the resisting effort which the ground exerts on the first wheels of the vehicle then being fairly high.

According to an embodiment of the invention, when the second steering device is operated in the forced mode, the second steering angle $\alpha 2$ is set according to a second rule $F2(\alpha 1)$ depending on the first steering angle $\alpha 1$ and different from the first rule $F1(\alpha 1)$. The second rule can be defined by a function that is linear or not and can further depend on other parameters than $\alpha 1$ such as the vehicle speed, etc.

In concrete terms, the rule used to calculate $\alpha 2$ as a function of $\alpha 1$ is not the same in normal mode and in forced mode. The threshold value of the steering wheel torque is the data which makes the controller choose the appropriate rule.

The second rule can be defined by $F2(\alpha 1)=f(\alpha 1)+A$ with $f(\alpha 1)$ being identical or different from the first rule $F1(\alpha 1)$ and A being a constant value or a function depending on the steering wheel torque and/or on the time.

Preferably, F2 could be such that $F2(\alpha 1=0)\neq 0$. In other words, the the second wheels can be, for instance, oversteered as soon as the steering wheel torque is greater than said threshold and even if the driver cannot turn the steering wheel. For example $F2=f(\alpha 1)+A$, with A being a constant different from zero.

A linear function representative of the first rule can be, for instance, defined by $F1(\alpha 1)=r1\times \alpha 1$ and a linear function representative of the second rule can be defined by $F2(\alpha 1)=r2\times \alpha 1+A$ with r1 and r2 being different ratios of $\alpha 1/\alpha 2$, r2 being, greater than r1 and A being a constant different from zero.

Alternatively; it could be envisaged that $F2(\alpha 1=0)=0$ in case it is certain that the driver will always succeed in turning the steering wheel by an angle that could be very small but sufficient to cause, for instance, an oversteering of the second wheels, thereby initiating, the turning movement of the vehicle.

In this alternative, the first rule can be defined, for instance, by $F1(\alpha 1)=r1\times\alpha 1$ and the second rule can be defined by $F2(\alpha 1)=r2\times\alpha 1$ with r1 and r2 being different ratios of $\alpha 1/\alpha 2$ and r2 being greater than r1

In the preceding embodiments, the ratio r2 that is different from r1 correspond to the different data of the rule used to calculate $\alpha 2$ in the forced mode.

In another alternative, A can be an increasing function of the steering wheel torque, meaning that A increases when the steering wheel torque increases over said threshold. The advantage of such an implementation is that the steering assistance increases when the steering wheel resistive torque continues to increase over said threshold.

A, as a function of the steering wheel torque, can be substantially constant above a predetermined steering wheel torque value greater than said threshold value.

According to another embodiment of the invention, when the second steering device is operated in the forced mode, the second steering angle $\alpha 2$ is set according to the same first rule F1, that takes into account at least one different or additional data when the steering wheel torque is greater than said threshold.

The first rule can be defined so that $F1(\alpha 1)=g(\alpha 1)+h(X)$, with h(X) being a function depending on an additional data X and which is equal or approximately equal to zero when the steering wheel torque is below said threshold.

The additional data X can be the steering wheel torque SWT so that $F1(\alpha 1)=g(\alpha 1)+h(SWT)$, with $h(SWT)=0$ or h(SWT) approximately equal to zero when the steering wheel torque (SWT) is below said threshold (SWTth).

On the one hand, in normal mode (i.e. when the steering wheel torque is below said threshold): $\alpha 2=F1(\alpha 1)=g(\alpha 1)+h(X)$ with $h(X)=0$.

On the other hand, in forced mode (when the steering wheel torque is above said threshold): $\alpha 2=F1(\alpha 1)=g(\alpha 1)+h(X)$ with $h(X)\neq 0$. In other words, in forced mode, it is taken into account an additional data X so that a corresponding value h(X) is added to the rule of normal mode.

In this implementation, the rule by which $\alpha 2$ is set according, to $\alpha 1$ remains the same whatever the operating mode, which can be easier to implement. It is as if the threshold value of the steering wheel torque would be included in the function F1.

Preferably, h(SWT) can be an increasing function of the steering wheel torque, meaning that h(SWT) increases when the steering wheel torque increases over said threshold. The advantage of such an implementation is that the steering assistance increases when the steering wheel resistive torque continues to increase over said threshold.

h(X) can be substantially constant above said threshold value or above a predetermined steering wheel torque value greater than said threshold value.

It has to be noted that h(X) could further depend on other data than the steering wheel torque.

In particular, h(X) can further depend on time t and on the steering wheel torque SWT, so that $h(X)=h(t, SWT)$, where h(t, SWT) is an increasing function of time t if the steering wheel torque remains greater than said threshold. Owing to this progressivity, the driver can control and modulate the efforts exerted on the steering wheel and better control the vehicle operation.

For example, h(t, SWT) can substantially linearly depend on time until an upper plateau, where h(t, SWT) is maintained constant, when the steering wheel torque is greater than said threshold.

Besides, it can be provided that, after the steering wheel torque has exceeded said threshold, h(t, SWT) decreases until zero, as a function of time, if the steering wheel torque becomes lower than said threshold.

Said threshold can be comprised between about 10 and about 20 daN, for example between about 15 and about 20 daN.

The control method can further comprise warning the vehicle driver in case the second steering device is operated in the forced mode. The driver thus knows the vehicle has to be stopped as soon as possible.

According to a second aspect, the invention relates to a power steering system for a vehicle having two steered axles, i.e. a first steered axle joining two first wheels, and a second steered axle joining two second wheels, the power steering, system comprising:
  a first steering device designed to control the steering of at least one of the first wheels, according to a first steering angle ($\alpha 1$), said first steering device comprising:
    a mechanical transmission of the movement from a steering wheel of the vehicle to at least one of the first wheels;
    a first actuator controlled as a function of a parameter related to the steering wheel movement and capable of providing a steering assistance effort to at least one of the first wheels;
  a second steering device comprising a second actuator controlled by a controller as a function of a parameter related to the steering wheel movement, and designed to control the steering of at least one of the second wheels, according to a second steering angle $\alpha 2$ which is set according to a first rule F1 depending on the first steering angle $\alpha 1$, in normal operation of the power steering system;
  the power steering system further comprising detecting means which are capable of detecting or estimating a steering wheel torque greater than a predetermined threshold, and which are coupled to said controller, the controller being designed to set the second steering angle $\alpha 2$ according to a rule (F2, F1) which depends on the first steering angle ($\alpha 1$) and which takes into account at least one different or additional data, in a forced mode in which the steering wheel torque is greater than said threshold, in order to cause an offset-steering of said second wheel.

For example, the first and second axles are two front axles. The second steered axle can be located rearward from the first steered axle, although the reverse is also possible.

In an implementation, the first actuator and/or the second actuator can be hydraulic actuator(s).

According, to a third aspect, the invention relates to a vehicle having two front steered axles i.e. a first steered axle joining two first wheels, and a second steered axle joining two second wheels, where the second steered axle can be located rearward from the first steered axle, the vehicle comprising a power steering system as previously described.

These and other features and advantages will become apparent upon reading the following description in view of the drawing attached hereto representing, as non-limiting examples, embodiments of a power steering system and a control method thereof, according to the invention.

BRIEF DESCRIPTION OF THE DRAWINGS

The following detailed description of several embodiments of the invention is better understood when read in conjunction with the appended drawings, it being however understood that the invention is not limited to the specific embodiments disclosed.

DETAILED DESCRIPTION

The invention concerns a power steering system 1 which is intended for a vehicle having two front steered axles. Typically, such a vehicle can be a heavy duty truck such as those used at building sites or for roadwork.

Figure 1:
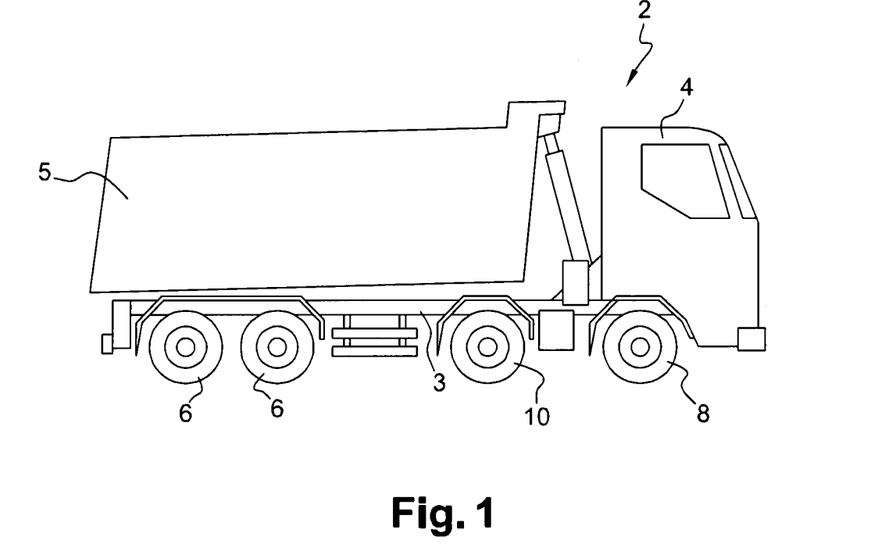
FIG. 1 is a side view of a vehicle having two front steered axles.

Such a vehicle 2 is illustrated in FIG. 1. The vehicle 2 comprises a frame 3, a cab 4 and a rear part 5 which can be, for example, a dump body. The vehicle 2 has rear axles, typically two rear axles which each join two rear wheels 6, as well as two front steered axles, i.e.:

a first steered axle 7 joining two first wheels 8;
and a second steered axle 9 joining two second wheels 10, said second steered axle 9 being located rearward from the first steered axle 7.

The vehicle 2 can be equipped with a power steering system 1 according to the invention, which will now be described.

The steering of the first wheels 8 is controlled by a first steering device 14.

Figure 2:
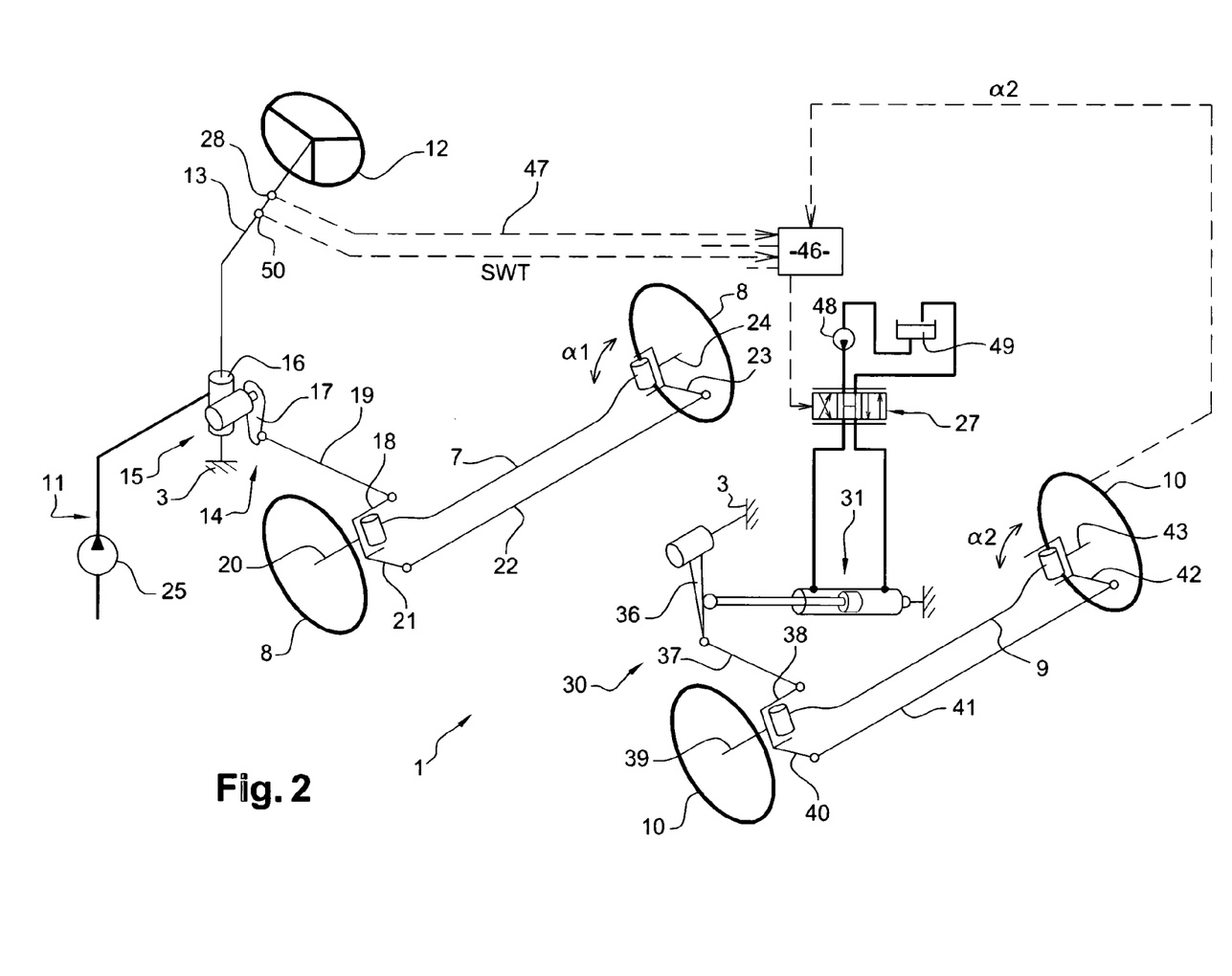
FIG. 2 is a schematic perspective view of a power steering system according to the invention, which can be implemented in the vehicle of FIG. 1 and controlled by the control method according to the invention.
Figure 3:
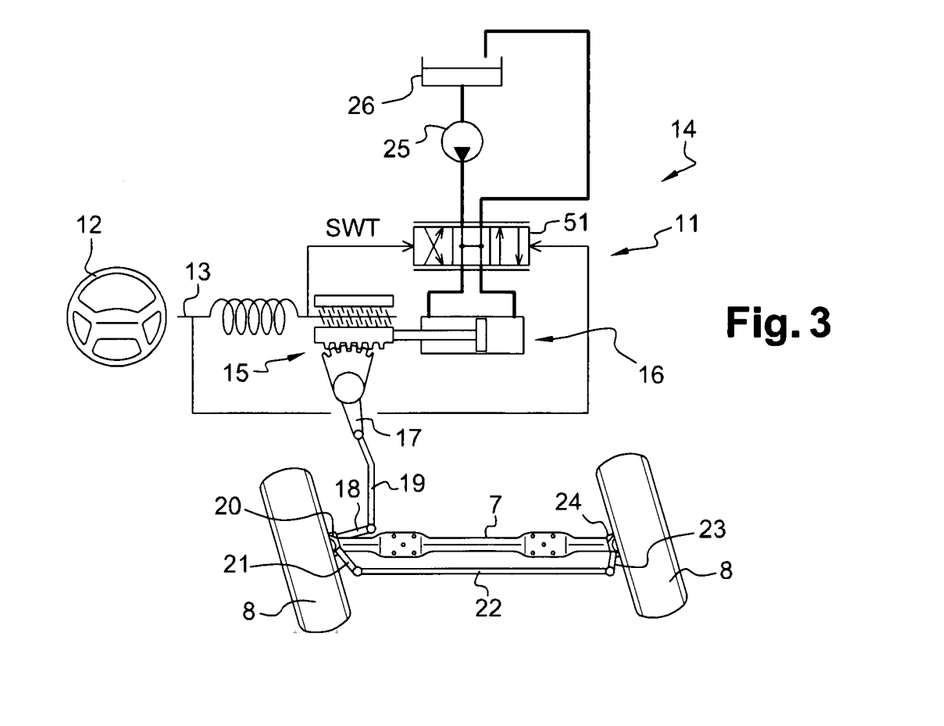
FIG. 3 is a schematic and partial representation of a first steering device of the power steering system according to the invention, designed to control the steering of at least one of the first wheels.

In the illustrated embodiment of FIGS. 2 and 3, the first steering device 14 first of all comprises a mechanical transmission of the movement from a steering wheel of the vehicle to at least one of the first wheels.

This mechanical transmission may include a steering wheel 12, or any other type of driver interface member, which is mechanically connected to a steering column 13 to drive, for example, a steering gear 15 which is connected to the first wheels 8 by a mechanical arrangement. This mechanical arrangement may, for example, include a drop arm 17 which transmits the steering movement from the steering gear 15 to an upper steering arm 18 via a drag link 19. From the upper steering arm 18, the movement continues to the steering knuckle 20 which makes the first wheel 8 turn. To make sure that the other first wheel 8 turns too, the steering wheel movement can be transmitted from the steering knuckle 20 with the aid of a lower steering arm 21, a track rod 22 and a further lower steering arm 23 to the steering knuckle 24 of the other first wheel 8.

Thus, the first steering device comprises an entirely mechanical transmission system for transmitting the movements of the steering wheel to the first wheel 8. The steering gear can for example be of the ball and nut type, as in the shown example, to change the rotating movement of the steering column in another rotating movement, for example around a perpendicular axis.

The steering gear could alternatively be of the rack and pinion type to transform the rotating movement of the steering column into a linear movement.

The first steering device 14 also comprises a first actuator 16 which is part of a steering assistance device 11. In the illustrated embodiment, first actuator 16 is a hydraulic actuator, this non being limitative.

The first hydraulic actuator 16 is controlled by a parameter related to the steering wheel movement, such as the steering wheel angle, the steering wheel speed, or the steering effort—or torque—on the steering wheel, and which is capable of providing a steering assistance effort to the first wheel 8 when needed.

The effort delivered by the first hydraulic actuator 16 is preferably set as a function of a steering effort exerted by the driver on the steering wheel 12. Such an effort is dependent on the resisting effort which the ground exerts on the first wheels 8 of the vehicle 2, opposing their movement around their steering axis. In a conventional embodiment, the first hydraulic actuator 16 is integrated with the steering gear 15 and is a two way actuator which receives pressurized fluid in one of its two chambers depending on the torque exerted by the driver on the steering wheel.

Typically, a control valve 51 is operated based on slight deformations which are induced by the steering and resisting efforts on a torque rod which is part of the mechanical transmission system in the steering gear 15. FIG. 3 schematically shows that the control valve 51 is proportionally controlled by the steering wheel torque SWT.

The steering assistance device 11 can further comprise a pump 25, which is generally driven by the engine of the vehicle, which is coupled to a hydraulic fluid tank 26 and which is capable of delivering said hydraulic fluid for the hydraulic actuator 16 in order to provide a steering assistance.

In order to make the second wheels 10 turn and to control them in steering position, the power steering system 1 further comprises a second steering device 30 which comprises a second actuator 31. In the illustrated embodiment, second actuator 31 is a hydraulic actuator, this non being limitative.

Figure 4:
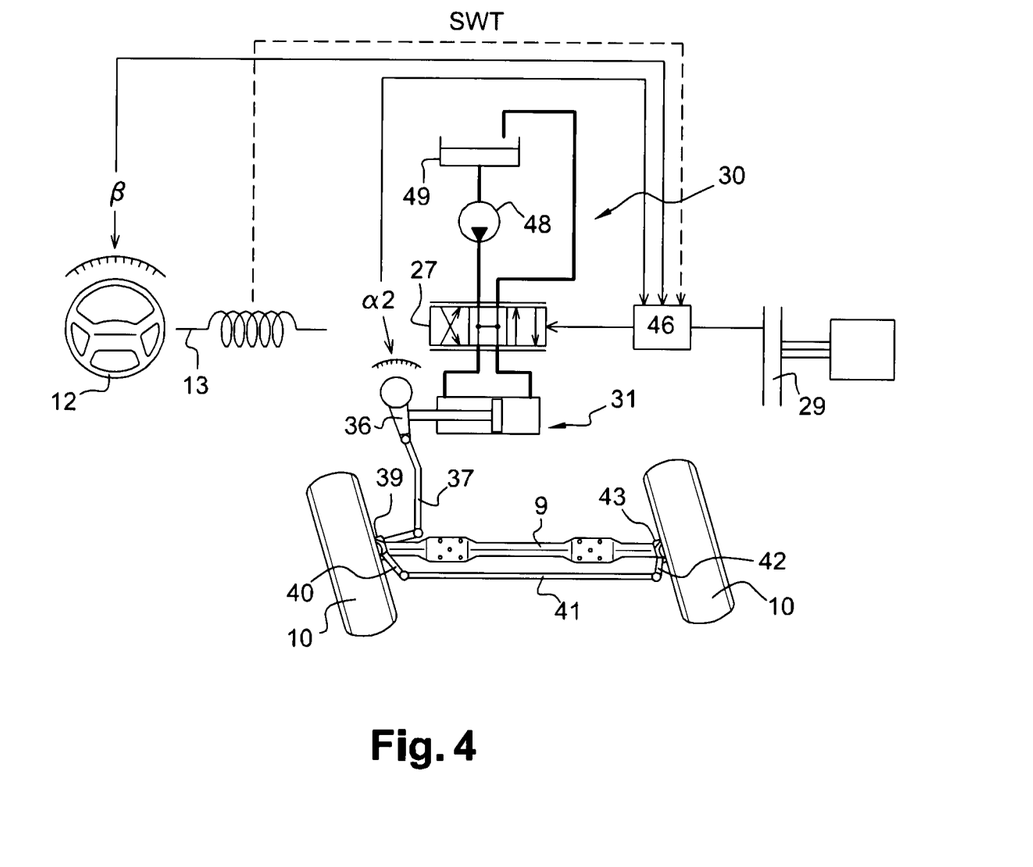
FIG. 4 is a schematic and partial representation of a second steering device of the power steering system according to the invention, designed to control the steering of at least one of the second wheels.

In the embodiment shown in FIGS. 2 and 4, the second hydraulic actuator 31 can be mounted, in non-limitative arrangement, between the vehicle frame 3 and an intermediate arm 36 mounted on said frame 3. The movement of said intermediate arm 36 can be transmitted to the right second wheel 10 by means of a drag link 37, an upper steering arm 38 and a steering knuckle 39. The steering wheel movement can be transmitted from the steering knuckle 39 with the aid of a lower steering arm 40, a track rod 41 and a further lower steering arm 42 to the steering knuckle 43 of the other second wheel 10.

The second hydraulic actuator 31 can be controlled as a function of a parameter 47 related to the steering wheel movement, by a controller 46 which can typically be an electronic controller. The electronic, controller 46 typically is preferably connected to a vehicle databus 29 and can therefore calculate a desired steering angle $\alpha 2$ for the second wheels 10, depending on a number of parameters which, in addition to the parameter 47, can include one or several of the vehicle speed, the vehicle weight, the vehicle weight distribution, the road surface adhesion, potential vehicle slippage detected by an electronic stability control program, etc.

The parameter 47 can be set from a control member of the steering, on which the driver can act, preferably a steering angle $\beta$ of the steering wheel 12 detected on the steering column 13, which may for example be detected by an appropriate sensor 28 on the steering column 13. Nevertheless, the steering position instruction can be taken from any part of the mechanical transmission which ensures the rotation of the first steered axle 7. The steering parameter 47 is representative of the steering angle $\alpha 1$ of any one of the first wheels 8.

Preferably, the controller 46 can be capable of controlling the second hydraulic actuator 31 according to said parameter 47 in a closed loop, with a feedback information from the second axle 9 representative of the steering angle $\alpha 2$ of any one of the second wheels 10.

The second steering device 30 can further comprise a pump 48 which is coupled to a hydraulic fluid tank 49 and which is capable of delivering said hydraulic fluid to the second hydraulic actuator 31, for example through a directional valve 27 proportionally controlled by controller 46.

Preferably, the power source capable of operating the second hydraulic actuator can be independent of the power source capable of operating the first hydraulic actuator 16. Preferably, in the illustrated embodiment, the pumps 25 and 48 are separate and are powered by different sources. For instance the first pump can be coupled to the engine of the vehicle whereas the second pump 48 is connected to a battery or to a generator of the vehicle in order to be electrically powered. This arrangement provides a security system which ensures that the power steering system 1 is still at least partially operating, even in case of a failure of one or the other of the first hydraulic actuator 16 and the second hydraulic actuator 31, or of one of the pumps 25, 48.

Figure 5:
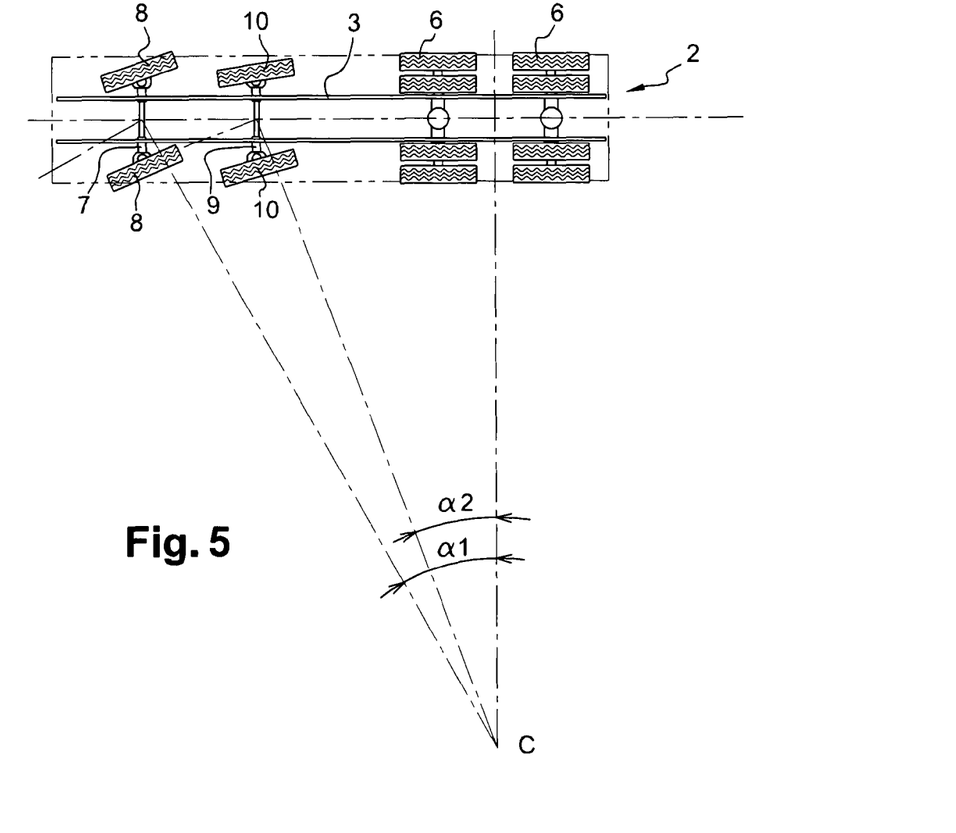
FIG. 5 is a schematic top view of the vehicle of FIG. 1, showing the first steering angle α1 and the second steering angle α2 in a normal mode.

In practice, as shown in FIG. 5, the first steering device 14 is designed to control the steering of at least one of the first wheels 8 according to a first steering angle $\alpha 1$, and the second steering device 30 is designed to control the steering of at least one of the second wheels 10 according to a second steering angle $\alpha 2$.

For geometrical and mechanical reasons, $\alpha 2$ is different from $\alpha 1$, namely lower in absolute value than $\alpha 1$, so that all steered wheels 8, 10 can have substantially the same rotation centre C.

Figure 6:
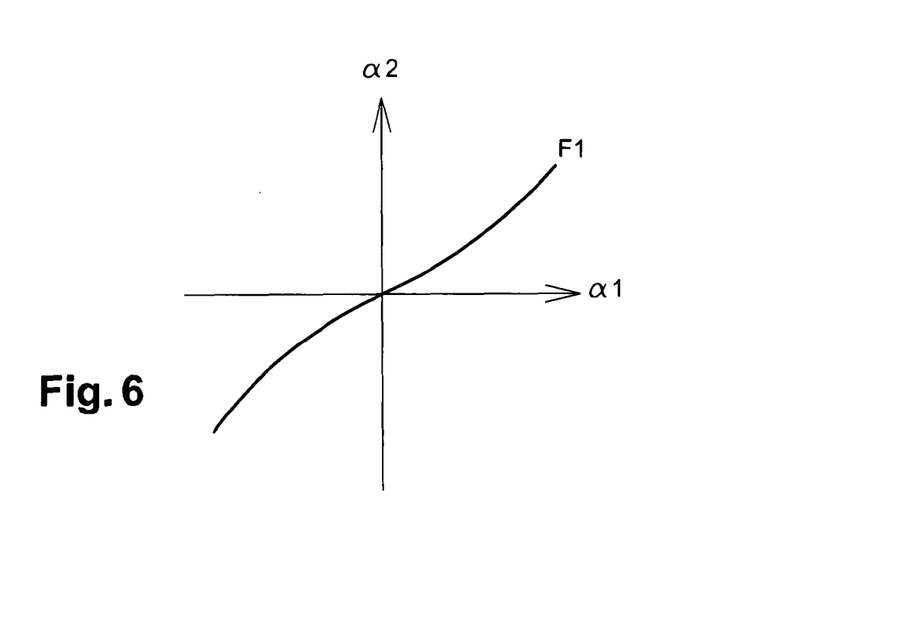
FIG. 6 is a graph showing the variation of α2 depending on α1 in a normal mode.

In normal mode, i.e. when no excessive demands are made on the driver's strength to manoeuvre the vehicle 2, $\alpha 2$ is set according to a first rule F1 depending on the first steering angle crt i.e. $\alpha 2 = F1(\alpha 1)$. One typical example of F1 is shown on the graph of FIG. 6.

The invention provides a control method of the power steering system 1 designed to ensure that a sufficient steering assistance is always available for the driver.

For that purpose, the control method comprises detecting or estimating whether the steering wheel torque SWT is greater than a predetermined threshold SWTth. In practice, there may be provided an appropriate torque sensor 50, for example on the steering column 13, which can monitor the steering wheel torque SWT. The predetermined threshold SWTth is for example comprised between about 10 and about 20 daN, and preferably between about 15 and about 20 daN.

In case the steering wheel torque SWT is greater than said threshold SWTth, the control method includes operating the second steering device 30 in a forced mode by setting the second steering angle $\alpha 2$ according to a rule depending on the first steering angle $\alpha 1$ and taking into account at least one different or additional data, in order to cause an offset-steering of said second wheel 10, i.e.:
- the offset-steering is an oversteering of said second wheel 10 if the torque SWT applied by the driver on the steering wheel 12 is oriented in order to turn said second wheel 10 so that it moves away from its neutral position, or
- the offset-steering is an understeering of said second wheel 10 if the torque SWT applied, by the driver on the steering wheel 12 is oriented in order to turn said second wheel 10 so that it moves closer to its neutral position.

In other words, in said forced mode and when the steering wheel torque SWT is applied to turn said second wheel 10 so that it moves away from its neutral position, the absolute value of $\alpha 2$ is greater than it would be in normal mode for the same value of $\alpha 1$.

On the contrary, in said forced mode and when the steering wheel torque SWT is applied to turn said second wheel 10 so that it moves closer to its neutral position, the absolute value of $\alpha 2$ is lower than it would be in normal mode for the same value of $\alpha 1$.

Furthermore, the sign of $\alpha 2$ depends on the direction in which the steering wheel 12 is turned, this information being available by means of the sensor 28 arranged on the steering column 13.

Oversteering or understeering the second wheels 10 results in reducing the resistive effort that opposes to the rotating movement of first wheels, which helps the driver initiate or continue a turning manoeuvre of the vehicle 2. The invention can in particular, but not exclusively, be used in case a failure is detected in the operation of the steering assistance device 11.

According to a first embodiment of the invention, when the second steering device 30 is operated in the forced mode, the second steering angle $\alpha 2$ is set according to as second rule $F2(\alpha 1)$ which depends on the first steering angle $\alpha 1$ and which is different from the first rule $F1(\alpha 1)$, which means that the controller 46 is capable of switching from one rule to the other depending on the value of the steering wheel torque SWT relative to the threshold SWTth.

Figure 7:
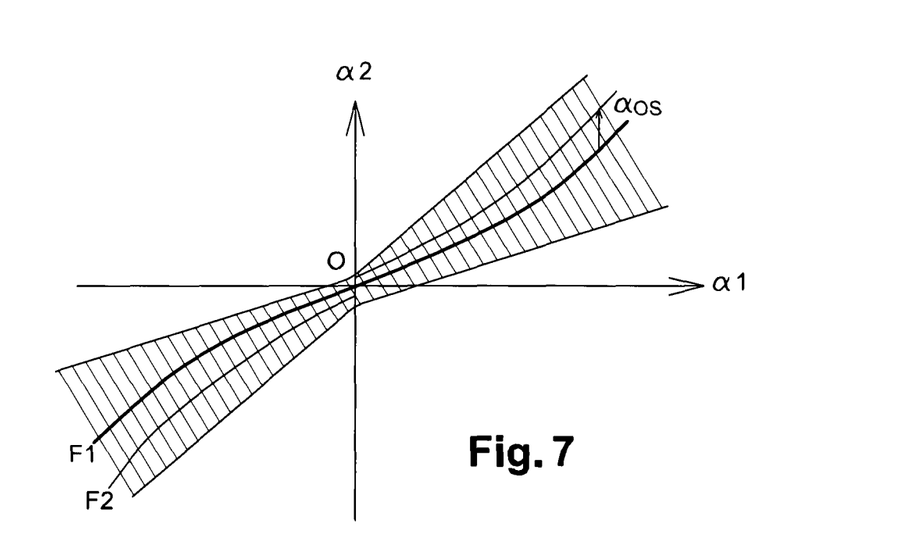
FIG. 7 is a graph showing the variation of α2 depending on α1 in a forced mode, according to an embodiment of the invention.

FIG. 7 shows curves representing an example of non-linear rules $F1(\alpha 1)$ and $F2(\alpha 1)$. For the sake of clarity, the curve F2 representative of the rule $F2(\alpha 1)$ is only represented in a situation corresponding to the oversteering of the second wheels 10. In practice, in absolute value, $\alpha 2$ set according to $F2(\alpha 1)$, in an oversteering situation, is greater than $\alpha 2$ set according to $F1(\alpha 1)$, for a given value of $\alpha 1$, the increase corresponding to an oversteering angle $\alpha os$. On the other hand, in absolute value, $\alpha 2$ set according to $F2(\alpha 1)$, in an understeering situation, is lower than $\alpha 2$ set according to $F1(\alpha 1)$, for a given value of $\alpha 1$, the decrease corresponding to an understeering angle $\alpha us$ (not represented). By way of an example, the maximum value of $\alpha os$ and $\alpha us$, respectively $\alpha os$ max and $\alpha us$ max, can be in the range of 2 to 5°, for example around 3°.

The hatched area in FIG. 7 schematically delimits the adequate area for rule $F2(\alpha 1)$ that leads to satisfactory results in terms of steering assistance.

The depicted graph of rule $F2(\alpha1)$ shows that, according to a possible implementation, $F2(\alpha1)$ is different from zero when $\alpha1=0$. This disposition is advantageous in that, even if the driver can not at all turn the steering wheel 12, a low oversteering, more generally a low offset-steering, can be obtained thanks to the invention, in order to initiate a turning movement which can be later amplified.

According to a variant of the first embodiment, the second rule can be defined by $F2(\alpha1)=f(\alpha1)+A$ with $f(\alpha1)$ being identical or different from the first rule $F1(\alpha1)$ and A being a function depending on the steering wheel torque SWT and/or on the time t.

Preferably, A is a function of the steering wheel torque SWT and more preferably A is an increasing function of the steering wheel torque SWT, so that the more effort the driver exert on the steering wheel 12, the more steering assistance is provided.

According to a second embodiment of the invention, when the second steering device 30 is operated in the forced mode, the second steering angle $\alpha2$ is set according to the same first rule $F1(\alpha1)$ that takes into account at least one different or additional data when the steering wheel torque SWT is greater than said threshold SWTth.

The first rule is then defined so that $F1(\alpha1)=g(\alpha1)+h(X)$.

In this equation, $h(X)$ is a function depending on at least one additional data (X), such as the steering wheel torque (SWT), which is equal to zero or approximately equal to zero when the steering wheel torque SWT is below the threshold SWTth and which represents an offset-steering angle $\alpha os$, $\alpha us$ when the steering wheel torque SWT is greater than the threshold SWTth.

In other words, the controller 46 always uses the same rule to set $\alpha2$ as a function of $\alpha1$, whatever the value of the steering wheel torque SWT relative to the threshold SWTth.

Preferably, h can be an increasing function of the steering wheel torque SWT, so that the more effort the driver exert on the steering wheel 12, the more steering assistance is provided.

In the following examples depicted in FIGS. 8, 9a and 9b, it is considered the case where the forced mode can be triggered to oversteer the second wheels 10. Equivalent examples for the case where the forced mode is triggered to understeer the second wheels case can be easily deducted from the following ones.

Figure 8:
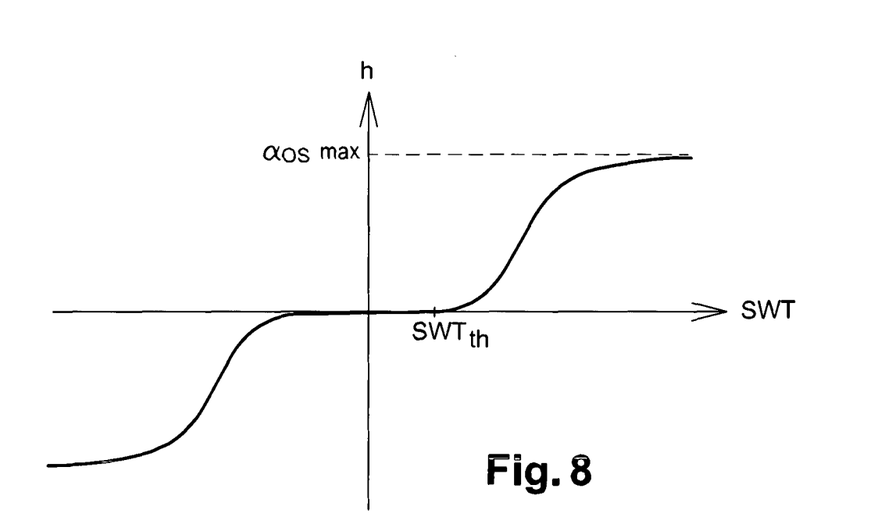
FIG. 8 is a graph showing the variation of the oversteering angle of the second wheels depending on the steering wheel torque, according to an embodiment of the invention.

FIG. 8 shows such an example of increasing function h(SWT). In this implementation, after the steering wheel torque SWT has reached the threshold SWTth, h(SWT) first of all progressively increases, then increases substantially linearly before the increase progressively slows down until h reaches a plateau, above a predetermined steering wheel torque value. This plateau corresponds to the maximum value $\alpha os$ max of $\alpha os$. Of course, other types or functions could be envisaged.

An example of function h(SWT) equivalent to the one represented in FIG. 8 is as follows:

$$h = B \times S \times [a\tan(slope \times (\text{absolute value of SWT} - SWTth)) - a\tan(slope \times (-SWTth))]/pi$$

where
B is an amplitude, for example around 3°,
S is a sign corresponding to the direction in which the steering wheel is turned,
the constant slope can be around 0.5°/daN,
SWTth is for example 20 daN.

Figure 9A:
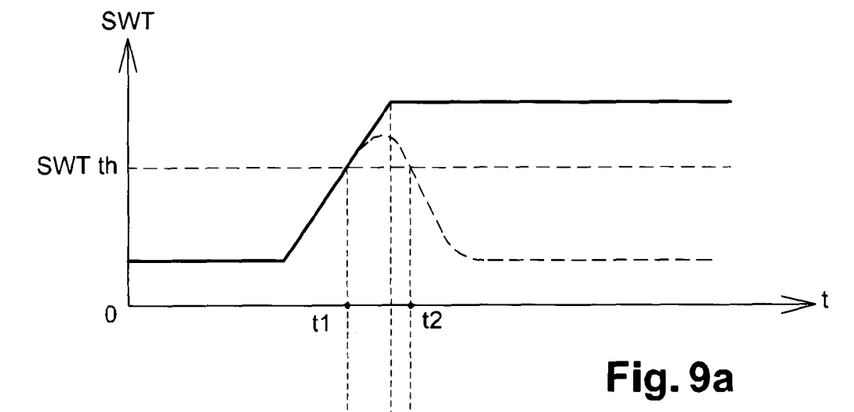
FIGS. 9a and 9b are graphs showing the variation of the steering wheel torque, respectively of the corresponding oversteering angle of the second wheels, depending, on time.
Figure 9B:
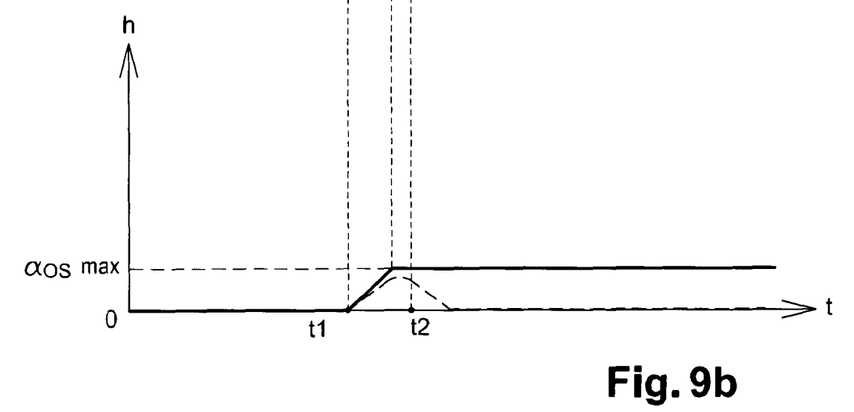

Reference is now made to FIGS. 9a and 9b which illustrate a third embodiment of the invention, in which the rule used in the forced mode is also as follows: $F1(\alpha1)=g(\alpha1)+h(X)$.

In this embodiment, however, h further depends on time t. Function h is preferably an increasing function of time if the steering wheel torque SWT remains greater than said threshold SWTth. Therefore, if the driver maintains the effort he exerts on the steering wheel 12 above the threshold SWTth, for example but not exclusively if said effort increases, it means that he still cannot manoeuvre the vehicle 2, or not sufficiently, and then the steering assistance provided increases. This further enable the driver to modulate the efforts exerted on the steering wheel 12 and better control the vehicle operation.

As depicted on FIGS. 9a and 9b, when the steering wheel torque SWT exceeds the threshold SWTth, at t1, the oversteering angle $\alpha os$ (i.e. function h) begins to increase. For example, h can substantially linearly increase as a function of time, but other implementations are possible.

As shown in continuous line, if the steering wheel torque SWT goes on increasing, the oversteering angle $\alpha os$ also increases until it reaches an upper plateau, which corresponds to the maximum value $\alpha os$ max of $\alpha os$.

On the contrary, as shown in dotted line, if the steeling wheel torque SWT decreases below the threshold SWTth, at t2, the oversteering angle $\alpha os$ h decreases until zero as a function of time, so that the system can be operated in normal mode again.

Thus, in the third embodiment, the value of $\alpha os$ is defined by the duration of high steering wheel torque SWT (i.e. above the threshold SWTth).

Therefore, owing to the control method and the power steering system according to the invention, even in specific ground conditions or in case one of the above components fails, the system remains dimensioned to help the driver to turn the wheels, in order to fulfil the regulation requirements in terms of steering wheel force.

Moreover, the power steering system can be devoid of any link rod between the first axle and the second axle for transmitting the steering movement of the first wheels the second wheels, thereby freeing space for other equipment, reducing fuel consumption, while always ensuring to the driver an efficient steering assistance.

The first and second steering devices, which are mechanically independent, and furthermore preferably hydraulically independent, thereby increasing the system security.

The invention is of course not limited to the embodiments described above as examples, but encompasses all technical equivalents and alternatives of the means described as well as combinations thereof.

The invention claimed is:

1. A control method of a power steering system for a vehicle having two steered axles, the two steered axles comprising a first steered axle joining two first wheels, and a second steered axle joining two second wheels, the power steering system comprising:
   a first steering device designed to control the steering of at least one of the first wheels, according to a first steering angle ($\alpha1$), the first steering device comprising:
      a mechanical transmission of the movement from a steering wheel of the vehicle to at least one of the first wheels;
      a steering assistance device including a first actuator controlled as a function of a parameter related to the steering wheel movement and capable of providing a steering assistance effort to at least one of the first wheels;

a second steering device comprising a second actuator controlled by a controller as a function of a parameter related to the steering wheel movement, and designed to control the steering of at least one of the second wheels, according to a second steering angle ($\alpha 2$) which is set according to a first rule (F1($\alpha 1$)) depending on the first steering angle ($\alpha 1$), in normal operation of the power steering; system;

wherein the control method comprises:

detecting or estimating whether a steering wheel torque (SWT) is greater than a predetermined threshold (SWTth), in case the steering wheel torque (SWT) is greater than the threshold (SWTth), operating the second steering device in a forced mode by setting the second steering angle ($\alpha 2$) according to a second rule (F2, F1) which depends on the first steering angle ($\alpha 1$) and which takes into account at least one different or additional data, in order to cause an offset- steering of the second wheel.

2. The control method according to claim 1, wherein the control method comprises operating the second steering device in a forced mode in case a failure is detected in the operation of the steering assistance device.

3. The control method according to claim 1, wherein, when the second steering device is operated in the forced mode, the second steering angle ($\alpha 2$) is set according to a second rule (F2($\alpha 1$)) depending on the first steering angle ($\alpha 1$) and different from the first rule (F1($\alpha 1$)).

4. The control method according to claim 3, wherein the second rule is defined by F2($\alpha 1$)=f($\alpha 1$)+A with f($\alpha 1$) being identical or different from the first rule (F1($\alpha 1$)) and A being: a constant value or a function depending on the steering wheel torque (SWT)) and or on the time (t).

5. The control method according to claim 3, wherein F2($\alpha 1$=0)≠0.

6. The control method according to claim 4, wherein F2($\alpha 1$=0)≠0, and the first rule is defined by F1($\alpha 1$)=r1×$\alpha 1$ and the second rule is defined by F2($\alpha 1$)=r2×$\alpha 1$+A with r1 and r2 being different ratios of $\alpha 1$ /$\alpha 2$, r2 being greater than r1 and A a constant not being zero.

7. The control method according to claim 3, wherein the first rule is defined by F1($\alpha 1$)=r1×$\alpha 1$ and the second rule is defined by F2($\alpha 1$)=r2×$\alpha 1$ with r1 and r2 being different ratios of $\alpha 1/\alpha 2$ and r2 being greater than r1.

8. The control method according to claim 4, wherein A is an increasing function of the steering wheel torque (SWT).

9. The control method according to claim 8, wherein A is substantially constant above a predetermined steering wheel torque value greater than the threshold value (SWTth).

10. The control method according to claim 1, wherein, when the second steering device is operated in the forced mode, the second steering angle ($\alpha 2$) is set according to the same first rule (F1($\alpha 1$)) that takes into account at least one different or additional data when the steering wheel torque (SWT) is greater than the threshold (SWTth).

11. The control method according to claim 10, wherein, the first rule is defined so that $$F1(\alpha 1)=g(\alpha 1)+h(X)$$

with h(X) being a function depending on an additional data (X) and which is equal or approximately equal to zero when the steering wheel torque (SWT) is below the threshold (SWTth).

12. The control method according to claim 10, wherein the additional data (X) is the steering wheel torque (SWT), so that $$F1(\alpha 1)=g(\alpha 1)+h(SWT)$$

with h(SWT)=0or h(SWT) is approximately equal 0 when the steering wheel torque (SWT) is below the threshold (SWTth).

13. The control method according to claim 12, wherein h(SWT) is an increasing function of the steering wheel torque (SWT).

14. The control method according to claim 12, wherein h(SWT) is substantially constant above the threshold value (SWTth) or above a predetermined steering, wheel torque value greater than the threshold value (SWTth).

15. The control method according to claim 10, wherein h(X) depends on time (t) and on the steering wheel torque (SWT), so that h(X)=h(t, SWT), h(t, SWT) being an increasing function of time (t) if the steering wheel torque (SWT) remains greater than the threshold (SWTth).

16. The control method according to claim 15, wherein h(t, SWT) substantially linearly depends on time (t) until an upper plateau, when the steering wheel torque (SWT) is greater than the threshold (SWTth).

17. The control method according to claim 15, wherein, after the steering wheel torque (SWT) has exceeded the threshold (SWTth), h(t, SWT) decreases until zero, as a function of time, if the steering wheel torque (SWT) becomes lower than the threshold (SWTth).

18. The control method according to claim 1, wherein the threshold (SWTth) is comprised between 10 and 20 daN.

19. The control method according to claim 1, comprising warning the vehicle driver in case the second steering device is operated in the forced mode.

20. A power steering system for a vehicle having two steered axles, the two steered axles comprising a first steered axle joining two first wheels, and a second steered axle joining two second wheels, the power steering system comprising:

a first steering device designed to control the steering of at least one of the first wheels, according to a first steering angle ($\alpha 1$), the first steering device comprising:

a mechanical transmission of the movement from a steering wheel of the vehicle to at least one of the first wheels;

a first actuator controlled as a function of a parameter related to the steering wheel movement and capable of providing a steering assistance effort to at least one of the first wheels;

a second steering device comprising a second actuator controlled by a controller as a function of a parameter related to the steering wheel movement, and designed to control the steering of at least one of the second wheels, according to a second steering angle ($\alpha 2$) which is set according to a first rule (F1) depending on the first steering angle ($\alpha 1$), in normal operation of the power steering system;

wherein the power steering system further comprises detecting means which are capable of detecting or estimating a steering wheel torque (SWT) greater than a predetermined threshold (SWTth), and which are coupled to the controller, the controller being designed to set the second steering angle ($\alpha 2$) according to a second rule (F2, F1) which depends on the first steering angle ($\alpha 1$) and which takes into account at least one different or additional data, in a forced mode in which the steering wheel torque (SWT) is greater than the threshold (SWTth), in order to cause an offset-steering of the second wheel.

21. The power steering system according to claim 20, wherein the first and second axles are two front axles.

22. The power steering, system according to claim 21, wherein the second steered axle is located rearward from the first steered axle.

23. The power steering system according to claim 20, wherein the first actuator and/or the second actuator is/are hydraulic actuator(s).

24. A vehicle having two front steered axles, the two front steered axles comprising a first steered axle joining two first wheels, and a second steered axle joining two second wheels, wherein it comprises a power steering system according to claim 20.

* * * * *